(12) United States Patent
Sun et al.

(10) Patent No.: US 8,798,173 B2
(45) Date of Patent: Aug. 5, 2014

(54) ADAPTIVE FILTERING BASED UPON BOUNDARY STRENGTH

(75) Inventors: Shijun Sun, Vancouver, WA (US); Shawmin Lei, Camas, WA (US); Hiroyuki Katata, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1254 days.

(21) Appl. No.: 11/641,741

(22) Filed: Dec. 20, 2006

(65) Prior Publication Data

US 2007/0098076 A1 May 3, 2007

Related U.S. Application Data

(60) Division of application No. 11/497,431, filed on Aug. 2, 2006, now Pat. No. 7,787,542, which is a division of application No. 10/799,384, filed on Mar. 11, 2004, now abandoned, which is a continuation of application No. PCT/JP02/09306, filed on Sep. 11, 2002, which is a continuation of application No. 09/953,329, filed on Sep. 14, 2001, now Pat. No. 7,450,641.

(51) Int. Cl.
| | |
|---|---|
| H04N 7/12 | (2006.01) |
| H04N 7/26 | (2006.01) |
| H04N 7/30 | (2006.01) |
| H04N 7/36 | (2006.01) |
| H04N 7/50 | (2006.01) |

(52) U.S. Cl.
CPC ... *H04N 19/00593* (2013.01); *H04N 19/00218* (2013.01); *H04N 19/00896* (2013.01); *H04N 19/00369* (2013.01); *H04N 19/00545* (2013.01); *H04N 19/00903* (2013.01); *H04N 19/00151* (2013.01); *H04N 19/00775* (2013.01); *H04N 19/00715* (2013.01); *H04N 19/00066* (2013.01); *H04N 19/00781* (2013.01); *H04N 19/00375* (2013.01); *H04N 19/00727* (2013.01); *H04N 19/00139* (2013.01); *H04N 19/00145* (2013.01); *H04N 19/00157* (2013.01); *H04N 19/00909* (2013.01); *H04N 19/00509* (2013.01); *H04N 19/00278* (2013.01)
USPC .................................................. 375/240.29

(58) Field of Classification Search
USPC .............. 375/240.01, 240.12, 240.16, 240.29
IPC ....................................................... H04N 7/12
See application file for complete search history.

(56) References Cited

U.S. PATENT DOCUMENTS

| | | | |
|---|---|---|---|
| 5,473,384 A | * | 12/1995 | Jayant et al. ............. 375/240.01 |
| 5,654,759 A | | 8/1997 | Augenbraun et al. |

(Continued)

FOREIGN PATENT DOCUMENTS

| | | |
|---|---|---|
| CA | 2 374 523 | 7/2001 |
| EP | 0 714 209 A2 | 5/1966 |

(Continued)

OTHER PUBLICATIONS

Peter List, Jani Lainema: "H.26L test model long term No. 8.40(TML-8.4), Software module: loop-filter.C" ITU-T Standardization Sector Study Group 16, VCEG, [Online] Aug. 29, 2001, XP002440062.

(Continued)

*Primary Examiner* — Young Lee
(74) *Attorney, Agent, or Firm* — Birch, Stewart, Kolasch & Birch, LLP

(57) ABSTRACT

Adjacent regions are identified in an image. Coding parameters for the adjacent regions are identified. Selective filtering is performed at the region between the identified adjacent regions.

6 Claims, 8 Drawing Sheets

(56) References Cited

U.S. PATENT DOCUMENTS

| | | | |
|---|---|---|---|
| 5,933,542 | A | 8/1999 | Chang et al. |
| 5,974,196 | A | 10/1999 | Chang et al. |
| 6,044,177 | A | 3/2000 | Herley |
| 6,104,434 | A | 8/2000 | Nakagawa et al. |
| 6,115,503 | A | 9/2000 | Kaup |
| 6,144,700 | A | 11/2000 | Kim et al. |
| 2001/0017944 | A1 | 8/2001 | Kalevo et al. |

FOREIGN PATENT DOCUMENTS

| | | |
|---|---|---|
| JP | 8-205178 | 8/1966 |
| JP | 11-275584 | 10/1999 |
| JP | 2000-299864 | 10/2000 |
| JP | 2001-094996 | 6/2001 |
| JP | 2001-204029 | 7/2001 |
| KP | 1997-0078645 | 12/1997 |

OTHER PUBLICATIONS

Chul-Woo Kim et al.: Simplified Loop Filter for Mobile Service (VCEG-M43) ITU—Telecommunication Standardization Sector Study Group 16, VCEG-M43, Mar. 28, 2001.

ITU—Telecommunications Standardization Sector; Study Group 16, Video Coding Experts Group; Document VCEG-M81, May 3, 2001; Austin, Texas, USA Apr. 2-4, 2001.

IEEE Transactions on Circuits and Systems for Video Technology, vol. 9, No. 1, Feb. 1999, A Deblocking Filter with Two Separate Modes in Block-Based Video Coding; Kim, et al.; pp. 156-160.

IEEE Transactions on Circuits and Systems for Video Technology, vol. 9, No. 3, Apr. 1999, Reduction of Blocking Artifacts in Image and Video Coding; Meier, et al.; pp. 490-499.

Video Coding Experts Group (VCEG). H.26L Test Model Long Term No. 6 (TML-6) draft.

Shijun Sun et al: Loop Filter with Skip Mode (VCEG-M20) ITU Telecommunications Standardization Sector Study Group 16, VCEG-M20, Mar. 27, 2001, pp. 1-8, XP002321426 Austin, Texas, USA sections 1 + 2 with figure 1.

Peter List: "Report of the Ad Hoc Committee on Loop Filter Improvement (VCEG-N08)" ITU Telecommunications Standardization Sector Study Group 16, VCEG-N08, 'Online! Sep. 4, 2001 (Oct. 4, 2001), pp. 1-3, XP0002347724, Santa Barbra, CA, USA Retrieved from internet: URL:http://ftp3.itu.int/av-arch/video-site/19_San. retrieved on Oct. 4, 2005 p. 1, line 1-p. 2, line 20 & "Index of /av-arch/video-site/0109_San" Online Sep. 4, 2001, pp. 1-4, Retrieved from internet:URL:http:://ftp.itu3.int/av-arch/video-site/0109_San> retrieved on Oct. 4, 2005 verification of publication date *p. 1, line 15*.

Gisle Bjontegaard: "H.26L Test Model Long 1-3 Term No. 6 (TML-6) Draft O" ITU-T Telecommunication Standardization Sector ITU, VCEG-L45DO, Geneva, CH, Mar. 3, 2001, pp. 1-35, XP001089815 sections 4.5-4.5.2.

Shijun Sun et al; "Improved TML Loop Filter with Lower Complexity (VCEG-n17)" ITU Telecommunication Standardization Sector Study Group 16, VCEG-N17, 'Online! Sep. 24, 2001, pp. 1-8 XP002347725 Santa Barbara, CA USA Retrieved from the internet: URL:http://ftp3.itu.int/av-arch/video-site/0109_San> "retrieved on Oct. 4, 2005" sections 1-2.3.

\* cited by examiner

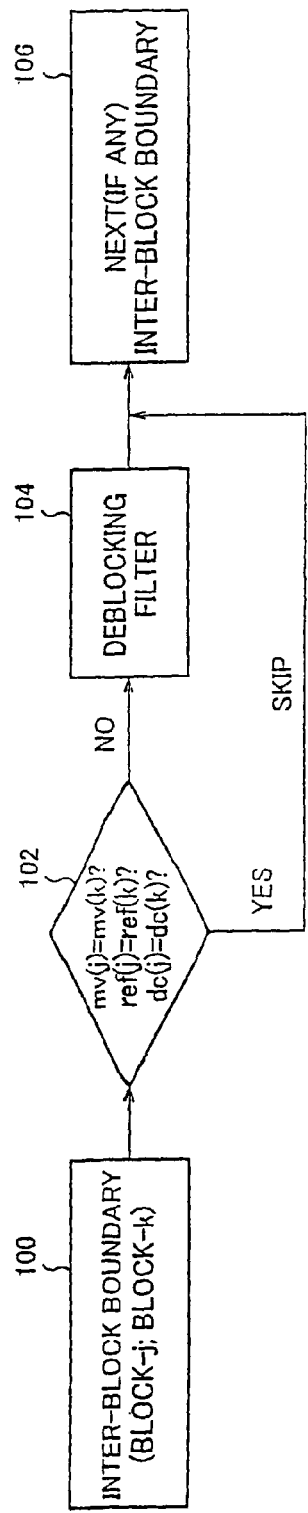

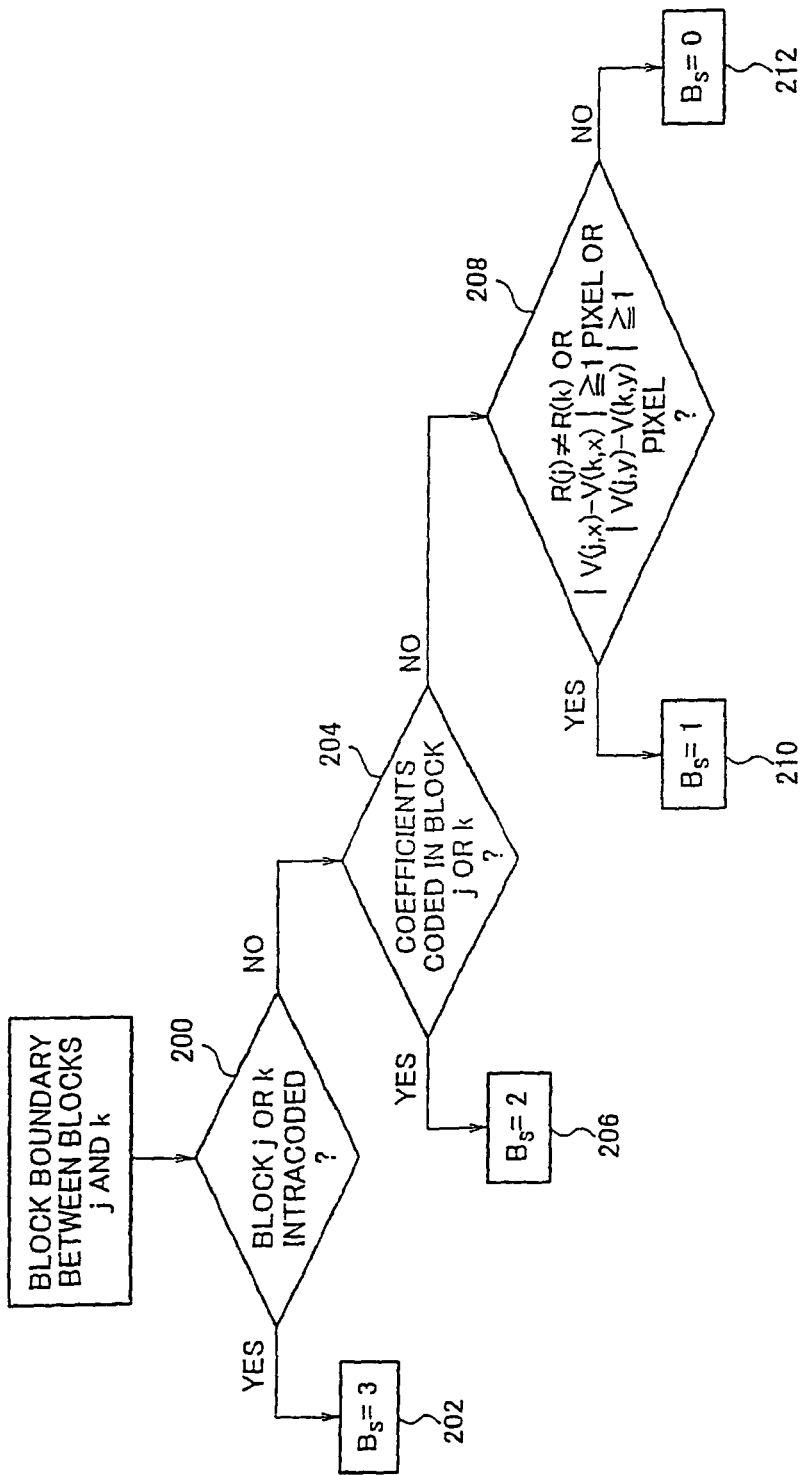

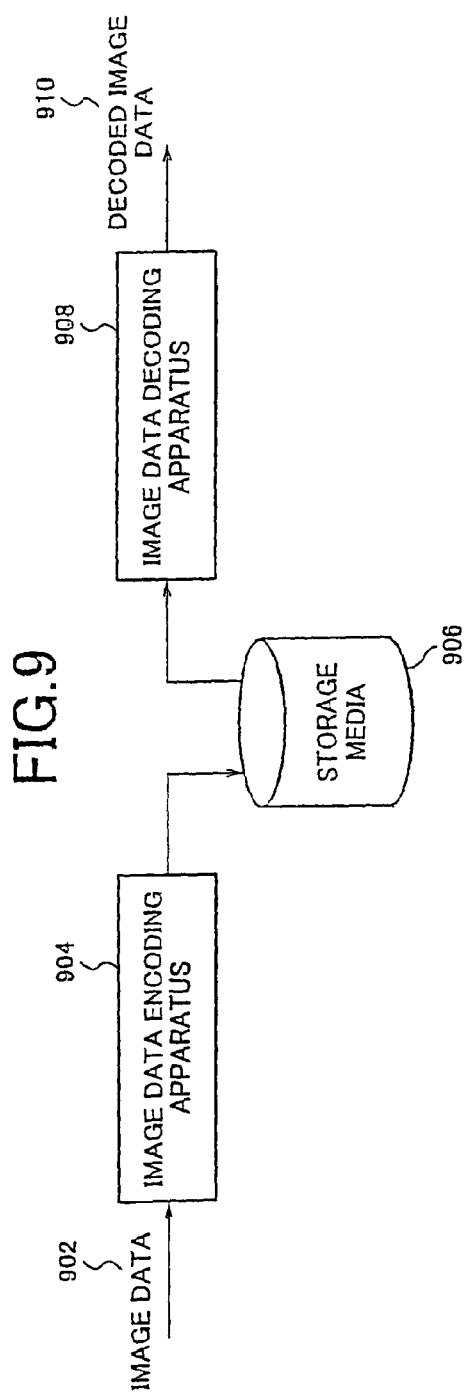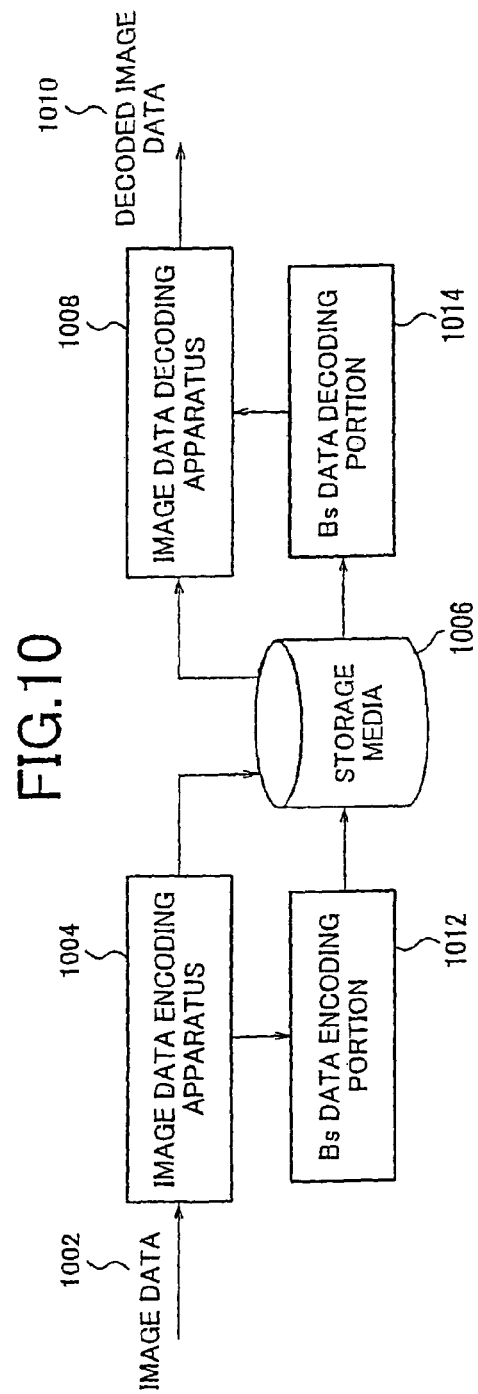

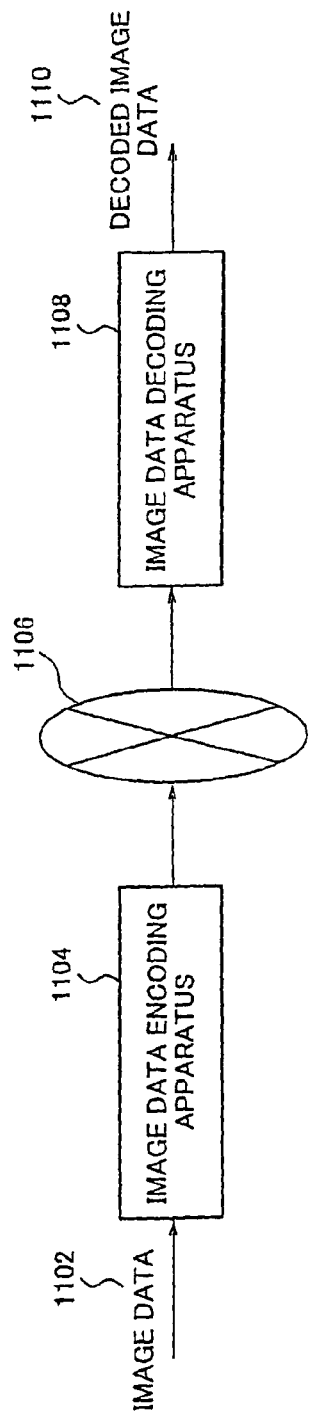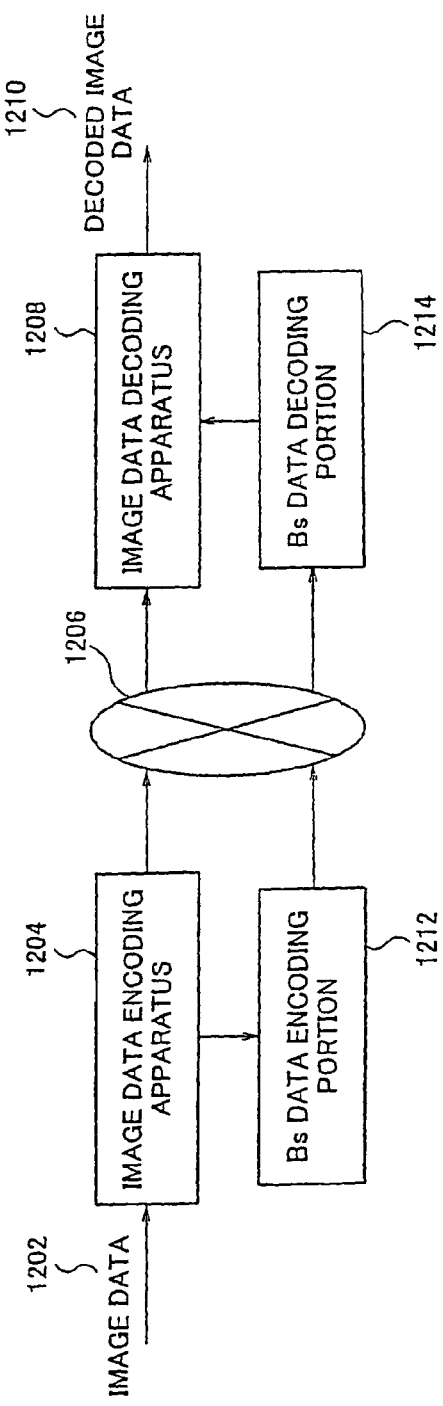

ADAPTIVE FILTERING BASED UPON BOUNDARY STRENGTH

CROSS-REFERENCE TO RELATED APPLICATIONS

This application is a Divisional Application of application Ser. No. 11/497,431 filed on Aug. 2, 2006, now U.S. Pat. No. 7,787,542 which is a Divisional Application of application Ser. No. 10/799,384 filed on Mar. 11, 2004 now abandoned and for which priority is claimed under 35 U.S.C. §120. application Ser. No. 10/799,384 is a continuation of International Application No. PCT/JP02/09306, filed Sep. 11, 2002, entitled "Adaptive Filtering Based upon Boundary Strength," invented by Shijun Sun, Shawmin Lei and Hiroyuki Katata, now published under International Publication No. WO 03/026313; which is a continuation of U.S. patent application Ser. No. 09/953,329, filed Sep. 14, 2001, now U.S. Pat. No. 7,450,641 entitled "Adaptive Filtering Based upon Boundary Strength," invented by Shijun Sun and Shawmin Lei. The entire contents of each of the above-identified applications are hereby incorporated by reference.

BACKGROUND OF THE INVENTION

Block based motion compensated video coding is used in many video compression standards, such as for example, H.261, H.263, H.263+, MPEG-1, MPEG-2, and H26L. Block based motion compensation encodes video pixels in a block by block manner using image compression techniques. The image compression techniques normally use lossy compression techniques that result in visual artifact in the decoded images, referred to generally as image artifacts. One type of image artifacts are blocking artifacts that occur along the block boundaries in a reconstructed image. The primary source of the blocking artifacts result from coarse quantization of transform coefficients used to encode the blocks.

Reconstructed images are the images produced after the blocks are inverse transformed and decoded. Image filtering techniques may be used to reduce the artifacts in reconstructed images. The rule of thumb for these image filtering techniques is that image edges should be preserved while the rest of the image should be smoothed. A low pass filter may be used as the image filter and its characteristics should be selected based on the characteristics of a particular pixel or set of pixels surrounding the image edges.

Non-correlated image pixels that extend across image block boundaries are specifically filtered to reduce blocking artifacts. While filtering techniques reduce blocking artifacts, however, these filtering techniques may unfortunately introduce blurring artifacts into the image. For example, if there are few or no blocking artifacts present between adjacent blocks, then the low pass filtering needlessly incorporates blurring into the image while at the same time wasting processing resources.

BRIEF DESCRIPTION OF THE DRAWINGS

FIG. 6 is a block diagram showing how deblock filtering is selectively skipped in a codec.

FIG. 7 is a representation of an existing block based image filtering technique.

FIG. 8 is a block diagram showing a technique for determining the boundaries to filter and the strength of the respective filter to use.

FIG. 9 is a drawing to explain other embodiments of the present invention.

FIG. 10 is a drawing to explain further embodiments of the present invention.

FIG. 11 is a drawing to explain further embodiments of the present invention.

FIG. 12 is a drawing to explain further embodiments of the present invention.

DETAILED DESCRIPTION OF THE PREFERRED EMBODIMENT

Conventional filtering processes consider a single reconstructed image frame at a time. Block based video encoding techniques may use motion vectors to estimate the movement of blocks consisting of a plurality of pixels. The motion-vector information is available at both the encoder and decoder but is not used with conventional filtering processes. For example, if two adjacent blocks share the same motion vector with respect to the same reference image frame, (for a multiple reference frames system) there is likely no significant difference between the image residuals of each block and accordingly should not be filtered. In essence, adjacent portions of the image have the same motion with respect to the same reference frame and accordingly no significant difference between the image residuals would be expected. In many cases, the block boundary of these two adjacent blocks may have been filtered in the reference frame and should therefore not be filtered again for the current frame. If a deblock filter is used without considering this motion-vector information, the conventional filtering process might filter the same boundary again and again from frame to frame. This unnecessary filtering not only causes unnecessary blurring but also results in additional filter computations.

Figure 1:
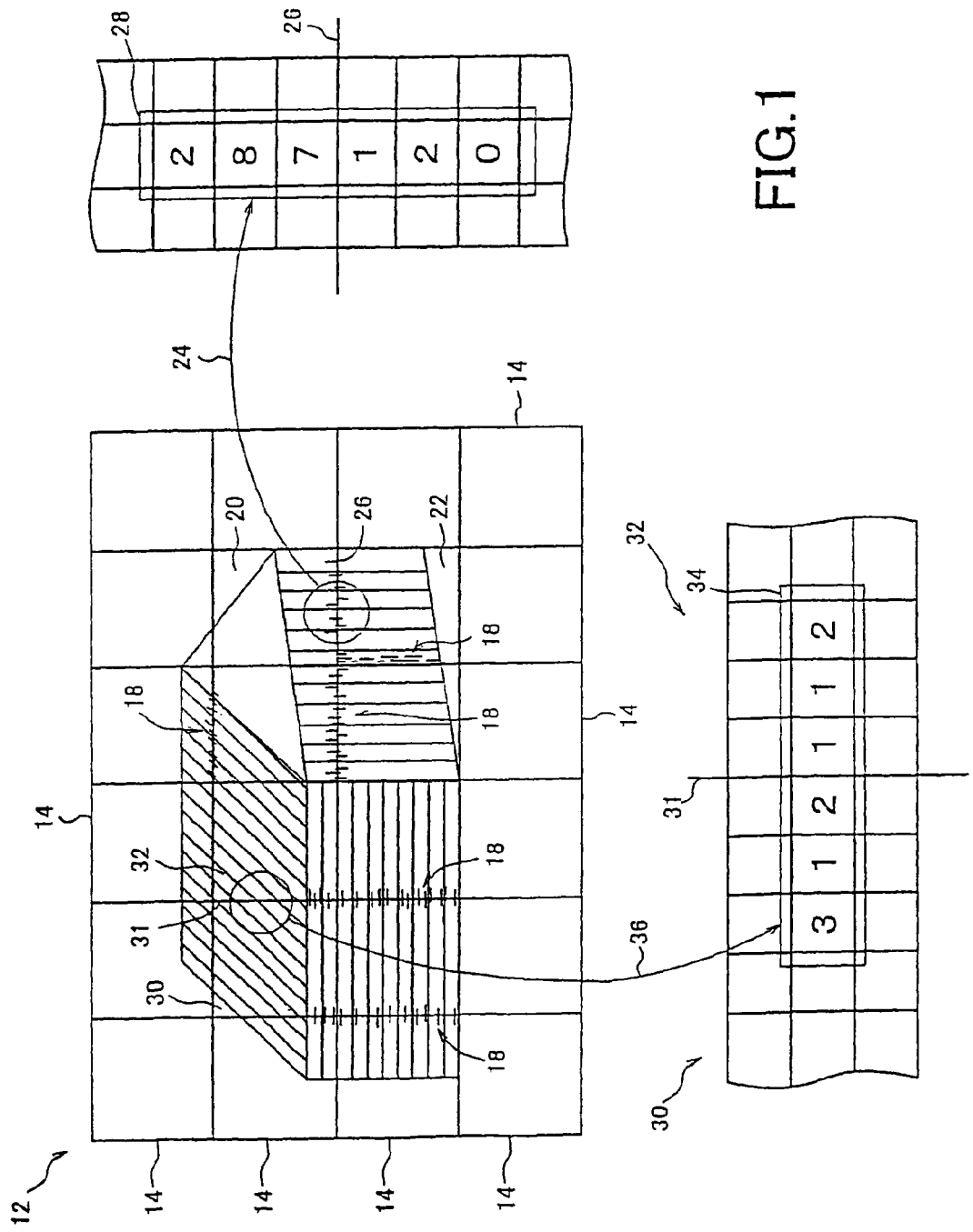
FIG. 1 is a diagram showing how deblock filtering is selectively skipped according to similarities between adjacent image blocks.

FIG. 1 illustrates an image 12 that selectively filters blocking artifacts according to similarities between image blocks. It is to be understood that the image may likewise use non-square blocks or any other sets of pixels. The borders between some of the blocks 14 include blocking artifacts 18. In general blocking artifacts are any image discontinuities between blocks 14 that may result from the encoding and/or decoding process. A low pass filter or other filter may be used to reduce the blocking artifacts that exist at the borders of adjacent image blocks.

For example, blocking artifacts 24 exist between blocks 20 and 22. A low pass filter may be used at the border 26 between blocks 20 and 22 to remove or otherwise reduce the blocking artifacts 24. The low pass filter, for example, selects a group of pixels 28 from both sides of the border 26. An average pixel value, or any other statistical measure, is derived from the group of pixels 28. Then each individual pixel is compared to the average pixel value. Any pixels in group 28 outside of a predetermined range of the average pixel value is then replaced with the average pixel value.

As previously described, if there are few or no blocking artifacts 24 between the adjacent pixels, then the groups of pixels 28 may be needlessly filtered causing blurring in the image. A skip mode filtering scheme may use the motion estimation and/or compensation information for adjacent image blocks as a basis upon which to selectively filter. If the motion estimation and compensation information is sufficiently similar the filtering may be skipped. This avoids unnecessary image blurring and significantly reduces the required number of filtering operations, or any other appropriate value.

As an example, it may be determined during the encoding process that adjacent image blocks 30 and 32 have similar coding parameters. Accordingly, the deblock filtering may be skipped for the groups of pixels 34 that extend across the border 31 between adjacent blocks 30 and 32. Skip mode filtering can be used for any horizontal, vertical, or otherwise any boundary between adjacent blocks in the image 12.

Figure 2:
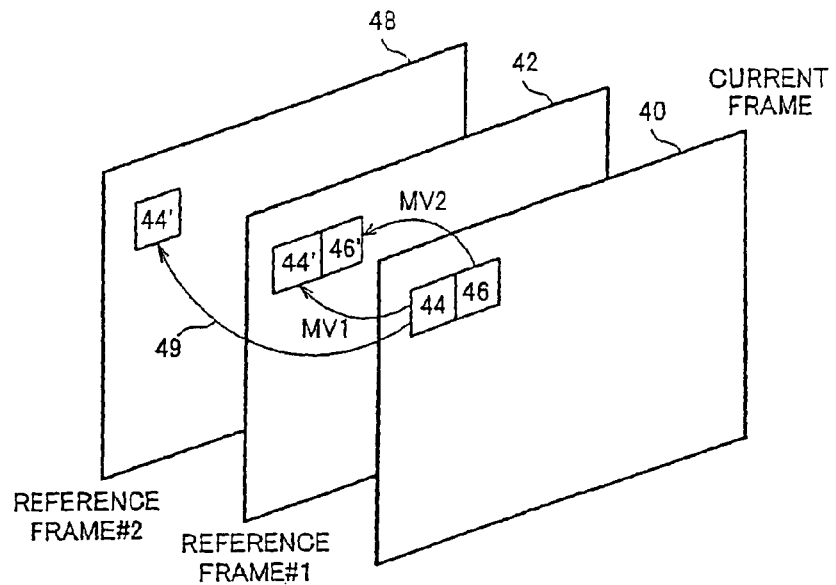
FIG. 2 is a diagram showing two adjacent image blocks having similar motion vectors.

FIG. 2 illustrates a reference frame 42, reference frame 48, and a current frame 40 that is currently being encoded or decoded. The coding parameters for blocks 44 and 46 are compared to determine whether the deblock filtering should be skipped between the two adjacent blocks 44 and 46. One of the encoding parameters that may be compared is the motion vectors (MV) for the blocks 44 and 46.

A motion vector MV1 points from block 44 in the current image frame 40 to an associated block 44' in the reference image 42. A motion vector MV2 points from block 46 in the current image frame 40 to an associated block 46' in the reference frame 42. A skip mode filtering checks to see if the motion vectors MV1 and MV2 point to adjacent blocks in the same reference frame 42. If the motion vectors point to adjacent blocks in the same reference frame (MV1=MV2), then the deblock filtering may be skipped. This motion vector information may be used along with other coding information to decide whether to skip deblock filtering between the two image blocks 44 and 46.

More than one reference frame may be used during the encoding and decoding process. For example, there may be another reference frame 48. The adjacent blocks 44 and 46 may have motion vectors pointing to different reference frames. In one example, the decision to skip deblock filtering depends on whether the motion vectors for the two adjacent blocks point to the same reference frame. For example, image block 44 may have a motion vector 49 pointing to reference frame 48 and image block 46 may have the motion vector MV2 pointing to reference frame 42. The deblock filtering is not skipped in this example because the motion vectors 49 and MV2 point to different reference frames.

Figure 3:
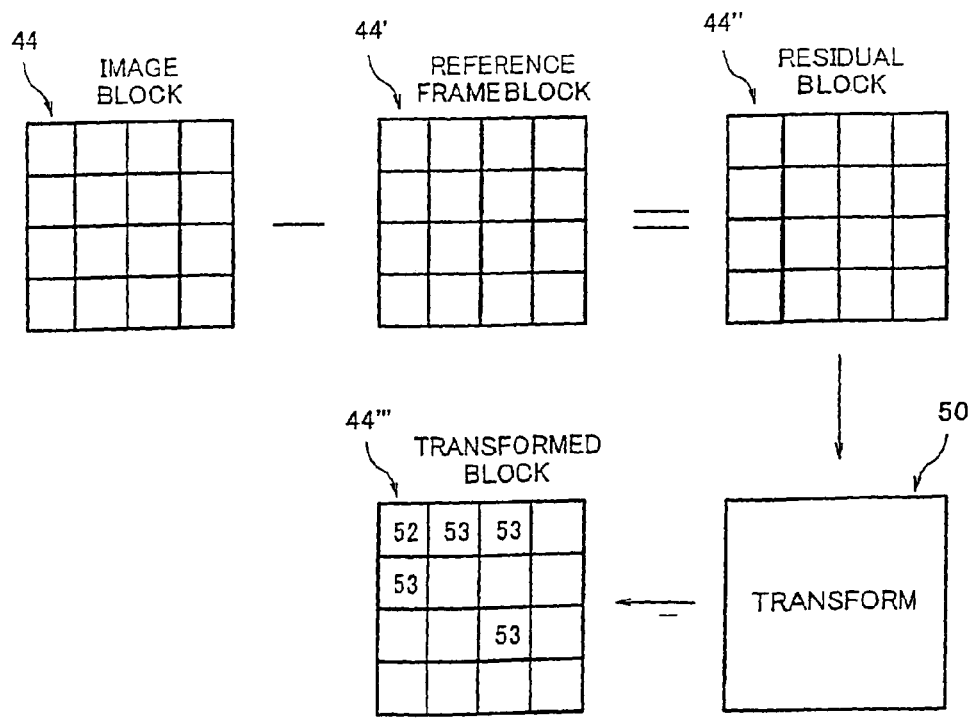
FIG. 3 is a diagram showing how transform coefficients are identified for one of the image blocks.

FIG. 3 illustrates another example of a coding parameter that may be used to decide whether or not to selectively skip deblock filtering. The image block 44 from image frame 40 is compared with reference block 44' from the reference frame 42 pointed to by the motion vector MV1 as previously illustrated in FIG. 2. A residual block 44" is output from the comparison between image block 44 and reference block 44". A transform 50 is performed on the residual block 44" creating a transformed block 44 of transform coefficients. In one example, the transform 50 is a Discrete Cosine Transform. The transformed block 44 includes D.C. components 52 and A.C. components 53.

The D.C. component 52 refers to a lowest frequency transform coefficient in image block 44. For example, the coefficient that represents the average energy in the image block 44. The A.C. components 53 refer to the transform coefficients that represent the higher frequency components in the image block 44. For example, the transform coefficients that represent the large energy differences between pixels in the image block 44.

Figure 4:
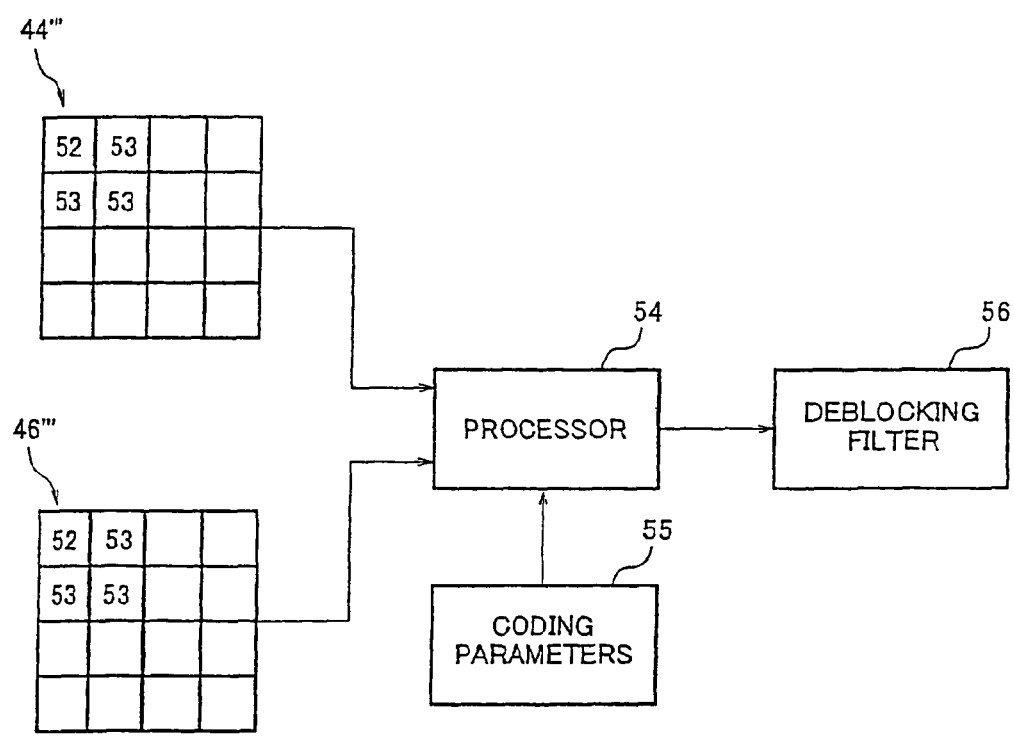
FIG. 4 is a diagram showing how residual transform coefficients are compared between two adjacent image blocks.

FIG. 4 illustrates the transformed residual blocks 44 and 46. The D.C. components 52 from the two transformed blocks 44 and 46 are compared in processor 54. If the D.C. components are the same or within some range of each other, the processor 54 notifies a deblock filter operation 56 to skip deblock filtering between the border of the two adjacent blocks 44 and 46. If the D.C. components 52 are not similar, then no skip notification is initiated and the border between blocks 44 and 46 is deblock filtered.

In one example, the skip mode filtering may be incorporated into the Telecommunications Sector of the International Telecommunication Union (ITU-T) proposed H.26L encoding scheme. The H.26L scheme uses 4×4 integer Discrete Cosine Transform (DCT) blocks. If desired, only the D.C. component of the two adjacent blocks may be checked. However some limited low frequency A.C. coefficients may likewise be checked, especially when the image blocks are larger sizes, such as 9×9 or 16×16 blocks. For example, the upper D.C. component 52 and the three lower frequency A.C. transform coefficients 53 for block 44 maybe compared with the upper D.C. component 52 and three lower frequency A.C. transform coefficients 53 for block 46. Different combinations of D.C. and/or any of the A.C. transform coefficients can be used to identify the relative similarity between the two adjacent blocks 44 and 46.

The processor 54 can also receive other coding parameters 55 that are generated during the coding process. These coding parameters include the motion vectors and reference frame information for the adjacent blocks 44 and 46 as previously described. The processor 54 may use some or all of these coding parameters to determine whether or not to skip deblock filtering between adjacent image blocks 44 and 46. Other encoding and transform functions performed on the image may be carried out in the same processor 54 or in a different processing circuit. In the case where all or most of the coding is done in the same processor, the skip mode is simply enabled by setting a skip parameter in the filtering routine.

Figure 5:
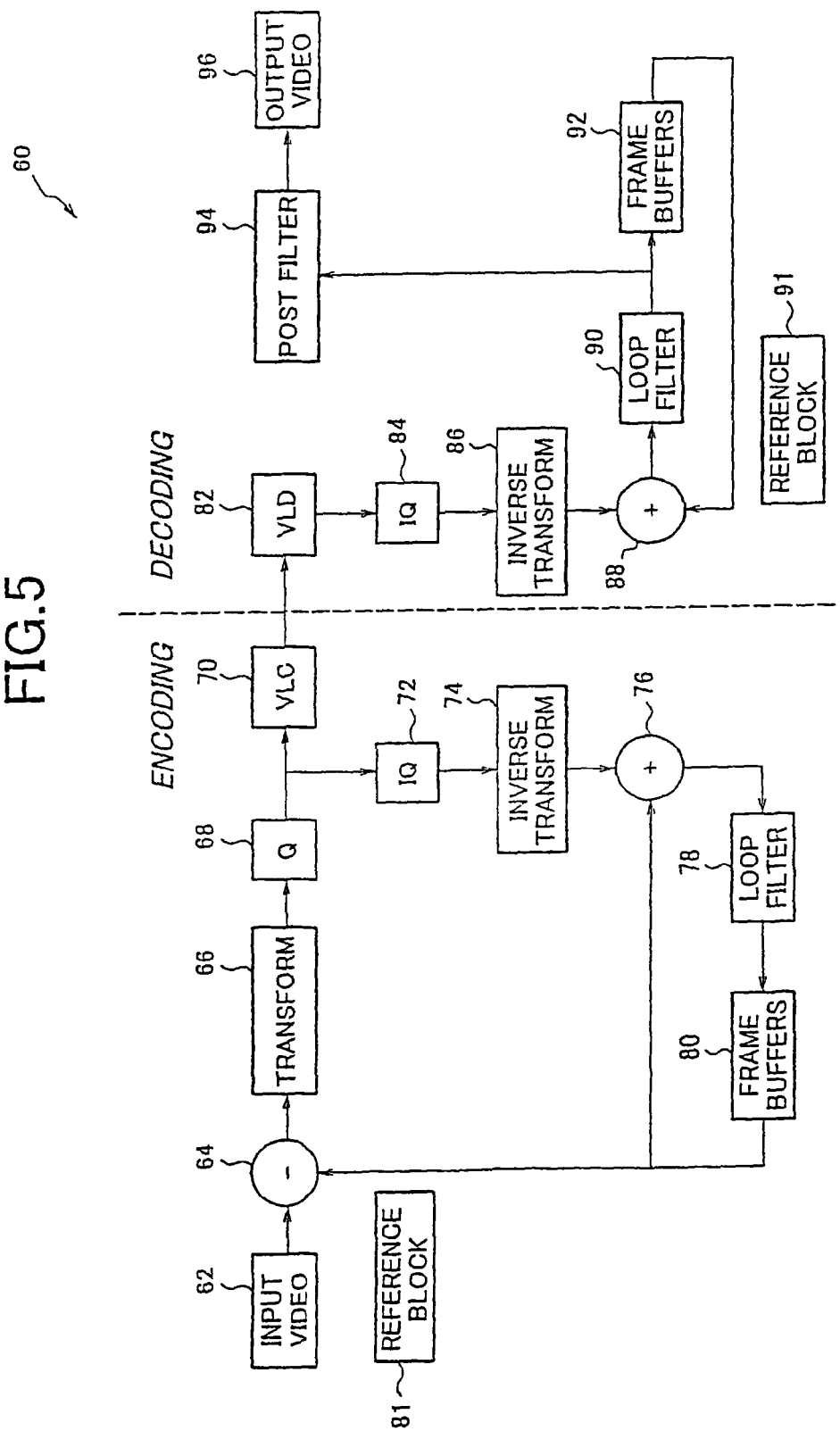
FIG. 5 is a block diagram showing how the video image is encoded and decoded.

FIG. 5 shows how skip mode filtering may be used in a block-based motion-compensated Coder-Decoder (Codec) 60. The codec 60 is used for inter-frame coding. An input video block from the current frame is fed from box 62 into a comparator 64. The output of a frame buffering box 80 generates a reference block 81 according to the estimated motion vector (and possible reference frame number). The difference between the input video block and the reference block 81 is transformed in box 66 and then quantized in box 68. The quantized transform block is encoded by a Variable Length Coder (VLC) in box 70 and then transmitted, stored, etc.

The encoding section of the codec 60 reconstructs the transformed image by first Inverse Quantizing (IQ) the transformed and quantized image in box 72. The inverse quantized image is then inverse transformed in box 74 to generate a reconstructed residual image. This reconstructed residual block is then added in box 76 to the reference block 81 to generate a reconstructed image block. Generally the reconstructed image is loop filtered in box 78 to reduce blocking artifacts caused by the quantization and transform process. The filtered image is then buffered in box 80 to form reference frames. The frame buffering in box 80 uses the reconstructed reference frames for motion estimation and compensation. The reference block 81 is compared to the input video block in comparator 64. An encoded image is output at node 71 from the encoding section and is then either stored or transmitted.

In a decoder portion of the codec 60, a variable length decoder (VLD) decodes the encoded image in box 82. The decoded image is inverse quantized in box 84 and inverse transformed in box 86. The reconstructed residual image from box 86 is added in the summing box 88 to the reference block 91 before being loop filtered in box 90 to reduce blocking artifacts and buffered in box 92 as reference frames. The reference block 91 is generated from box 92 according to the received motion vector information. The loop filtered output from box 90 can optionally be post filtered in box 94 to further reduce image artifacts before being displayed as, a video image in box 96. The skip mode filtering scheme can be performed in any combination of the filtering functions in boxes 78, 90 and 94.

The motion estimation and compensation information available during video coding are used to determine when to skip deblock filtering in boxes 78, 90 and/or 94. Since these coding parameters are already generated during the encoding and decoding process, there are no additional coding parameters that have to be generated or transmitted specially for skip mode filtering.

FIG. 6 shows is further detail how skip mode filtering may be used in the filters 78, 90, and/or 94 in the encoder and decoder in FIG. 5. The interblock boundary between any two adjacent blocks "i" and "k" is first identified in box 100. The two blocks may be horizontally or vertically adjacent in the image frame. Decision box 102 compares the motion vector mv(j) for block j with the motion vector mv(k) for block k. It is first determined whether the two adjacent blocks j and k have the same motion vector pointing to the same reference frame. In other words, the motion vectors for the adjacent blocks point to adjacent blocks (mv(j)=mv(k)) in the same reference frame (ref(j)=ref(k)).

It is then determined whether the residual coefficients for the two adjacent blocks are similar. If there is no significant difference between the image residuals of the adjacent blocks, for example, the two blocks j and k have the same or similar D.C. component (dc(j) dc(k)), then the deblock filtering process in box 104 is skipped. Skip mode filtering then moves to the next interblock boundary in box 106 and conducts the next comparison in decision box 102. Skip mode filtering can be performed for both horizontally adjacent blocks and vertically adjacent blocks.

In one embodiment, only the reference frame and motion vector information for the adjacent image blocks are used to determine block skipping. In another embodiment, only the D.C. and/or A.C. residual coefficients are used to determine block skipping. In another embodiment, the motion vector, reference frame and residual coefficients are all used to determine block skipping.

The skip mode filtering scheme can be applied to spatially subsampled chrominance channels. For example in a case with 4:2:0 color format sequences, skip mode filtering for block boundaries may only rely on the equality of motion vectors and D.C. components for the luminance component of the image. If the motion vectors and the D.C. components are the same, deblock filtering is skipped for both the luminance and chrominance components of the adjacent image blocks. In another embodiment, the motion vectors and the D.C. components are considered separately for each luminance and chrominance component of the adjacent blocks. In this case, a luminance or chrominance component for adjacent blocks may be deblock filtered while the other luminance or chrominance components for the same adjacent blocks are sometimes not deblock filtered.

Referring to FIG. 7, a technique recently proposed by others in H.26L defines a "block strength" parameter for the loop filter to control the loop filtering process. Each block of an image has a strength value that is associated with the block and controls the filtering performed on all of its four block boundaries. The block strength value is derived based on the motion vectors and the transform coefficients available in the bitstream. However, after consideration of the use of the block strength value for all four edges of the block, the present inventors came to the realization this results in removing some blocking artifacts at some edges while blurring along other edges.

In contrast to the block by block manner of filtering, the present inventors came to the realization that filtering determinations should be made in an edge by edge manner together with other information. The other information, may include for example, intra-block encoding of blocks, motion estimation of blocks with residual information, motion estimation of blocks without residual information, and motion estimation of blocks without residuals having sufficient differences. One, two, three, or four of these information characteristics may be used to improved filtering abilities in an edge by edge manner. Based upon different sets of characteristics, the filtering may be modified, as desired.

For each block boundary a control parameter is preferably defined, namely, a boundary strength Bs. Referring to FIG. 8 a pair of blocks sharing a common boundary are referred to as j and k. A first block 200 checks to see if either one of the two blocks is intra-coded. If either is intra-coded then the boundary strength is set to three at block 202. Block 200 determines if both of the blocks are not motion predicted. If no motion prediction is used then the block derives from the frame itself and accordingly there should be filtering performed on the boundary. This is normally appropriate because intra-coded block boundaries normally include blocking artifacts.

If both of the blocks j and k are, at least in part, predicted from a previous or future frame, then the blocks j and k are checked at block 204 to determine if any coefficients are coded. The coefficients, may be for example, discrete cosine transform coefficients. If either of the blocks j and k include non-zero coefficients, then at least one of the blocks represent a prediction from a previous or future frame together with modifications to the block using the coefficients, generally referred to as residuals. If either of the blocks j and k include non-zero coefficients (and motion predicted) then the boundary strength is set to two at block 206. This represents an occurrence where the images are predicted but the prediction is corrected using a residual. Accordingly, the images are likely to include blocking artifacts.

If both of the blocks j and k are motion predicted and do not include non-zero coefficients, generally referred to as residuals, then a determination at block 208 is made to check if the pixels on either side of the boundary are sufficiently different from one another. This may likewise be used to determine if the residuals are sufficiently small. If a sufficient difference exists then a blocking artifact is likely to exist. Initially a determination is made to determine if the two blocks use different reference frames, namely, R(j)≠R(k). If the blocks j and k are from two different reference frames then the boundary strength is assigned a value of one at block 210. Alternatively, if the absolute difference of the motion vectors of the two image blocks is checked to determine if they are greater than or equal to 1 pixel in either vertical or horizontal directions, namely, |V(j,x)−V(k,x)|≥1 pixel or |V(j,y)−V(k,y)|≥1 pixel. Other threshold values may likewise be used, as desired, including less than or greater than depending on the test used. If the absolute difference of the motion vectors is greater than or equal to one then the boundary strength is assigned a value of one.

If the two blocks j and k are motion predicted, without residuals, are based upon the same frame, and have insignificant differences, then the boundary strength value is assigned a value of zero. If the boundary strength value is assigned a value of zero the boundary is not filtered or otherwise adaptively filtered accordingly to the value of the boundary strength. It is to be understood that the system may lightly filter if the boundary strength is zero, if desired.

The value of the boundary strength, namely, one, two, and three, is used to control the pixel value adaptation range in the loop filter. If desired, each different boundary strength may be the basis of a different filtering. For example, in some embodiments, three kinds of filters may be used wherein a first filter is used when Bs=1, a second filter is used when Bs=2 and a third filter is used when Bs=3. It is to be understood that minimal filtering in comparison to other filtering which results in a more significant difference may be performed even when there is no filtering (corresponding to Bs=0). In the example shown in FIG. 8 the larger the value for Bs the greater the filtering. The filtering may be performed by any suitable technique, such as methods described in Joint Committee Draft (CD) of the Joint Video Team (JVT) of ISO/IEC MPEG and ITU-T VCEG (JVT-C167) or other known methods for filtering image artifacts.

Skip mode filtering can be used with any system that encodes or decodes multiple image frames. For example, DVD players, video recorders, or any system that transmits image data over a communications channel, such as over television channels or over the Internet. It is to be understood that the system may use the quantization parameter as a coding parameter, either alone or in combination with other coding parameters. In addition, it is to be understood that the system may be free from using the quantization parameter alone or free from using the quantization parameter at all for purposes of filtering.

The skip mode filtering described above can be implemented with dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

In some embodiments of the present invention as illustrated in FIG. 9, image data 902 may be input to an image data encoding apparatus 904 which includes the adaptive filtering portion as described above for some embodiments of the present invention. Output from the image data encoding apparatus 904 is an encoded image data and may then be stored on any computer-readable storage media 906. The storage media may include, but is not limited to, disc media, memory card media, or digital tape media. Storage media 906 may act as a short-term storage device. The encoded image data may be read from storage media 906 and decoded by an image data decoding apparatus 908 which includes the adaptive filtering portion as described above for some embodiments of the present invention. The decoded image data may be provided for output decoded image data 910 to a display or other device.

In some embodiments of the present invention, as illustrated in FIG. 10 image data 1002 may be encoded and the encoded image data may then be stored on storage media 1006 and image data decoding apparatus 1008 is the same as shown in FIG. 9. In FIG. 10, B's data encoding portion 1012 receives the value of the boundary strength B's for each block boundary and encoded by any data encoding method which includes DPCM, multi-value run-length coding, transform coding with loss-less feature and so on. The boundary strength B's may be generated as described in FIG. 8. The encoded boundary strength may then be stored on storage media 1006. In one example, the encoded boundary strength may be stored separately from the encoded image data. In other example, the encoded boundary strength and the encoded image data may be multiplexed before storing on the storage media 1006.

The encoded boundary strength may be read from the storage media 1006 and decoded by B's data decoding portion 1014 to input the decoded boundary strength to image data decoding apparatus 1008. When the decoded boundary strength is utilized in image data decoding apparatus 1008 to perform the adaptive filtering of the present invention, it may not be necessary to repeat the process described in FIG. 8 to generate boundary strength and this may save the processing power for the adaptive filtering.

In some embodiments of the present invention, as illustrated in FIG. 11, image data 1102 may be input to an image data encoding apparatus 1104 which includes the adaptive filtering portion as described above for some embodiments of the present invention. Output from the image data encoding apparatus 1104 is an encoded image data and may then be sent over a network, such as a LAN, WAN or the Internet 1106. The encoded image data may be received and decoded by an image decoding apparatus 1108 which also communicates with network 1106. The image data decoding apparatus 1108 includes the adaptive filtering portion as described above for some embodiments of the present invention. The decoded image data may be provided for output decoded image data 1110 to a display or other device.

In some embodiments of the present invention, as illustrated in FIG. 12, image data 1202 may be encoded and the encoded image data may then be sent over a network, such as a LAN, WAN or the Internet 1206. The basic procedure of image data encoding apparatus 1204 and image data decoding apparatus 1208 is the same as FIG. 11. In FIG. 12, Bs data encoding portion 1212 receives the value of the boundary strength Bs for each block and encoded by any data encoding method which includes DPCM, multi-value run-length coding, transform coding with loss-less features and so on. The boundary strength Bs may be generated as described in FIG. 8. The encoded boundary strength may then be sent over the network 1206. In one example, the encoded boundary strength may be sent separately from the encoded image data. In other examples, the encoded boundary strength and the encoded image data may be multiplexed before sending over the network 1206.

The encoded boundary strength may be received from the network 1206 and decoded by Bs data decoding portion 1214 to input the decoded boundary strength to image data decoding apparatus 1208 to perform the adaptive filtering of the present invention, it may not be necessary to repeat the process described in FIG. 8 to generate boundary strength and this may save the processing power for the adaptive filtering.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method for at least one of encoding and decoding an image, the image including a plurality of frames with each frame including a plurality of blocks, each having a plurality of pixels, the method comprising:

identifying adjacent blocks of a frame of said image;

examining conditions of coding parameters for said adjacent blocks of said frame;

determining boundary strengths for a boundary between said adjacent blocks of said frame; and selectively filtering at least a portion of said image proximate a boundary between said adjacent blocks of said frame based upon said conditions of coding parameters, wherein said conditions of coding parameters include whether said adjacent blocks of said frame have an absolute difference of motion vector components which is less than a threshold value in both vertical direction and horizontal direction, a strength of said selectively filtering is controlled by said boundary strength for said adjacent blocks of said frame, said boundary strength is a first value when said adjacent blocks of said frame have an absolute difference of motion vector components which is greater than or equal to a threshold value in either the vertical direction or the horizontal direction, and the boundary strength value is used to control a pixel value adaptation range in a loop filter.

2. The method of claim 1, wherein said boundary strength is a second value when said adjacent blocks of said frame are predicted from same reference frame and have an absolute difference of motion vector components which is less than the threshold value, and the strength of said selectively filtering for said second value is smaller than the strength of said selectively filtering for said first value.

3. An encoder for encoding an image, the image including a plurality of frames with each frame including a plurality of blocks, each having a plurality of pixels, the encoder comprising:

an identifier portion configured to identify adjacent blocks of a frame of said image;

a condition examiner portion configured to examine conditions of coding parameters for said adjacent blocks of said frame;

a determiner portion configured to determine boundary strengths for a boundary between said adjacent blocks of said frame; and a selective filter selectively filtering at least a portion of said image proximate a boundary between said adjacent blocks of said frame based upon said conditions of coding parameters, wherein said conditions of coding parameters include whether said adjacent blocks of said frame have an absolute difference of motion vector components which is less than a threshold value in both vertical direction and horizontal direction, a strength of said selectively filtering is controlled by said boundary strength for said adjacent blocks of said frame, said boundary strength is a first value when said adjacent blocks of said frame have an absolute difference of motion vector components which is greater than or equal to a threshold value in either the vertical direction or the horizontal direction, and the boundary strength value is used to control a pixel value adaptation range in a loop filter.

4. The encoder of claim 3, wherein said boundary strength is a second value when said adjacent blocks of said frame are predicted from same reference frame and have an absolute difference of motion vector components which is less than the threshold value, and the strength of said selectively filtering for said second value is smaller than the strength of said selectively filtering for said first value.

5. A decoder for decoding an image, the image including a plurality of frames with each frame including a plurality of blocks, each having a plurality of pixels, the decoder, comprising:

an identifier portion configured to identify adjacent blocks of a frame of said image;

a condition examiner portion configured to examine conditions of coding parameters for said adjacent blocks of said frame;

a determiner portion configured to determine boundary strengths for a boundary between said adjacent blocks of said frame; and a selective filter selectively filtering at least a portion of said image proximate a boundary between said adjacent blocks of said frame based upon said conditions of coding parameters, wherein said conditions of coding parameters include whether said adjacent blocks of said frame have an absolute difference of motion vector components which is less than a threshold value in both vertical direction and horizontal direction, a strength of selectively filtering by the filter is controlled by said boundary strength for said adjacent blocks of said frame, said boundary strength is a first value when said adjacent blocks of said frame have an absolute difference of motion vector components which is greater than or equal to a threshold value in either the vertical direction or the horizontal direction, and the boundary strength value is used to control a pixel value adaptation range in a loop filter.

6. The decoder of claim 5, wherein said boundary strength is a second value when said adjacent blocks of said frame are predicted from same reference frame and have an absolute difference of motion vector components which is less than the threshold value, and the strength of said selectively filtering for said second value is smaller than the strength of said selectively filtering for said first value.

* * * * *